United States Patent
Sugino et al.

(10) Patent No.: US 11,935,713 B2
(45) Date of Patent: Mar. 19, 2024

(54) VACUUM CIRCUIT BREAKER

(71) Applicant: Mitsubishi Electric Corporation, Tokyo (JP)

(72) Inventors: Kazuki Sugino, Tokyo (JP); Yasunori Nakamura, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 150 days.

(21) Appl. No.: 17/773,646

(22) PCT Filed: Jan. 10, 2020

(86) PCT No.: PCT/JP2020/000750
§ 371 (c)(1),
(2) Date: May 2, 2022

(87) PCT Pub. No.: WO2021/140668
PCT Pub. Date: Jul. 15, 2021

(65) Prior Publication Data
US 2022/0375705 A1    Nov. 24, 2022

(51) Int. Cl.
*H01H 33/662* (2006.01)
*H01H 33/666* (2006.01)

(52) U.S. Cl.
CPC .......... *H01H 33/66207* (2013.01); *H01H 33/66238* (2013.01); *H01H 33/6661* (2013.01); *H01H 2033/66223* (2013.01)

(58) Field of Classification Search
CPC ....... H01H 33/66207; H01H 33/66238; H01H 33/6661; H01H 33/42; H01H 33/53; H01H 2033/66223; H02B 13/0354
(Continued)

(56) References Cited

U.S. PATENT DOCUMENTS 8,895,884 B2 * 11/2014 Yamamoto ............ H01H 33/42
                                                        218/7
9,136,674 B2 * 9/2015 Ohtsuka ............ H02B 13/0354
(Continued)

FOREIGN PATENT DOCUMENTS

JP    2013058312 A    3/2013

OTHER PUBLICATIONS

International Search Report (PCT/ISA/210) with English translation and Written Opinion (PCT/ISA/237) dated Mar. 10, 2020, by the Japan Patent Office as the International Searching Authority for International Application No. PCT/JP2020/000750.

*Primary Examiner* — William A Bolton
(74) *Attorney, Agent, or Firm* — BUCHANAN INGERSOLL & ROONEY PC (57) ABSTRACT

A vacuum circuit breaker includes: a grounded tank; a vacuum valve including a vacuum container housing a movable contact and a stationary contact, a movable conductor that is connected to the movable contact and extends out of the vacuum container, and a tubular bellows; a tubular movable-side bushing conductor; a slider movably set inside the movable-side bushing conductor; a movable-side frame that communicates with a space inside a tube of the bellows and electrically connects the movable-side bushing conductor to the movable conductor; an operation rod having one end protruding to an outside of the grounded tank and an opposite end connected to the movable conductor; an operating device that moves the operation rod; a movable-side support plate covering an end of the grounded tank where the operation rod extends out of the grounded tank; and a packing set in a hole.

6 Claims, 5 Drawing Sheets

(58) Field of Classification Search
USPC ............ 218/118, 3, 119, 123, 120, 134, 139
See application file for complete search history.

(56) References Cited

U.S. PATENT DOCUMENTS

| | | | |
|---|---|---|---|
| 9,431,800 B2* | 8/2016 | Yoshida | H02B 13/045 |
| 9,640,350 B2* | 5/2017 | Stoving | H01H 33/6661 |
| 9,893,515 B2* | 2/2018 | Arioka | H01H 33/161 |
| 2012/0103941 A1* | 5/2012 | Nakayama | H02B 13/0354 |
| | | | 218/134 |
| 2014/0374383 A1* | 12/2014 | Shioiri | H01H 33/66207 |
| | | | 218/139 |
| 2015/0206683 A1* | 7/2015 | Ohda | H01H 47/22 |
| | | | 335/151 |
| 2015/0244158 A1* | 8/2015 | Fukuoka | H01B 17/26 |
| | | | 218/139 |
| 2018/0247780 A1* | 8/2018 | Nagatake | C22C 27/06 |

* cited by examiner

VACUUM CIRCUIT BREAKER

FIELD

The present disclosure relates to a vacuum circuit breaker that includes a grounded tank in which an insulating high-pressure gas is encapsulated and a vacuum valve that is disposed in the grounded tank and configured to interrupt an electric current.

BACKGROUND

A circuit breaker that interrupts an electric current in an electric power system generally includes: a stationary contact; a movable contact that can be moved in a direction away from the stationary contact at the time of interruption; a movable conductor connected to the movable contact; and an operation rod that is driven by an operating device to move the movable conductor with the movable contact.

Among circuit breakers, a vacuum circuit breaker that performs a path opening operation in a vacuum to make current interruption houses a movable contact and a stationary contact in a vacuum chamber that forms a vacuum space. The movable contact and the stationary contact are placed within a vacuum container, and a movable conductor extends through the vacuum container out of the vacuum container. A bellows is housed in the vacuum container together with the movable contact and stationary contact, the bellows being configured to keep the vacuum chamber airtight. The bellows has a shape of tubular bellows, one end of which is fixed to the movable conductor and an opposite end of which is fixed to the vacuum container. The bellows expands and contracts at the times of closing and interruption in association with movement of the movable conductor. The vacuum container, the movable conductor, and the bellows are used to constitute a vacuum valve.

Since the bellows has a shape of tubular bellows with an expansible construction, the bellows has low strength and may be damaged by a pressure difference between an interior and an exterior of the tube. In the vacuum circuit breaker that has the vacuum valve in a grounded tank in which an insulating high-pressure gas is encapsulated, a movable-side frame by which a movable conductor is connected to a movable-side bushing terminal is disposed outside a portion of the vacuum container through which the movable conductor extends. A space in the movable-side frame communicates with a space inside a movable-side bushing. For this reason, pressure in the movable-side frame needs to be atmospheric air pressure in order to prevent the bellows from being damaged by the pressure difference between the interior and the exterior thereof.

Patent Literature 1 discloses a vacuum circuit breaker that sets the inside of a movable-side frame to have atmospheric air pressure by having air vent portions provided in a movable-side support plate and a movable-side bushing terminal, respectively. In the vacuum circuit breaker disclosed in Patent Literature 1, there is set a filter for each of the air vent portions of the movable-side support plate and the movable-side bushing terminal, thereby restraining ingress of water droplets from the air vent portions.

CITATION LIST

Patent Literature

Patent Literature 1: Japanese Patent Application Laid-open No. 2013-58312

SUMMARY

Technical Problem

However, such a filter cannot completely prevent the ingress of water droplets, so that the vacuum circuit breaker disclosed in Patent Literature 1 mentioned above may allow water droplets to enter the grounded tank.

The present disclosure has been made in view of the above circumstances, and an object thereof is to provide a vacuum circuit breaker capable of preventing entrance of water droplets into a grounded tank and preventing damage to a bellows.

Solution to Problem

In order to solve the above-stated problem and achieve the object, the present disclosure a vacuum circuit breaker comprising: a grounded tank in which an insulating gas is encapsulated, the grounded tank having a tubular shape; a vacuum valve insulatively supported inside the grounded tank, the vacuum valve including a movable contact, a stationary contact, a vacuum container in which the movable contact and the stationary contact are housed, a movable conductor electrically connected to the movable contact, the movable conductor extending out of the vacuum container, and a tubular bellows having one end connected to the movable conductor and an opposite end connected to the vacuum container; a movable-side bushing conductor set in a bushing extending above the grounded tank, the movable-side bushing conductor having a tubular shape; a slider movably disposed inside the movable-side bushing conductor; a movable-side frame that is set adjacent to an outside of the vacuum container in a portion where the movable conductor extends out of the vacuum container, communicates with a space inside a tube of the bellows, and electrically connects a lower end of the movable-side bushing conductor to the movable conductor; an operation rod having one end portion protruding to an outside of the grounded tank and an opposite end portion connected to the movable conductor outside the vacuum container; an operating device set outside the grounded tank to move the operation rod along an axial direction of the grounded tank; a movable-side support plate having a hole formed therein, through which the operation rod passes and covering an end of the grounded tank where the operation rod extends out of the grounded tank; and a packing set in the hole to close a gap between the operation rod and the movable-side support plate in a watertight state.

Advantageous Effects of Invention

The vacuum circuit breaker obtained according to the present disclosure has an advantageous effect that it can prevent entrance of water droplets into the grounded tank and prevent damage to the bellows.

DESCRIPTION OF EMBODIMENTS

With reference to the drawings, a detailed description is hereinafter provided of vacuum circuit breakers according to embodiments. It is to be noted that these embodiments are not necessarily intended to limit the present disclosure.

First Embodiment

Figure 1:
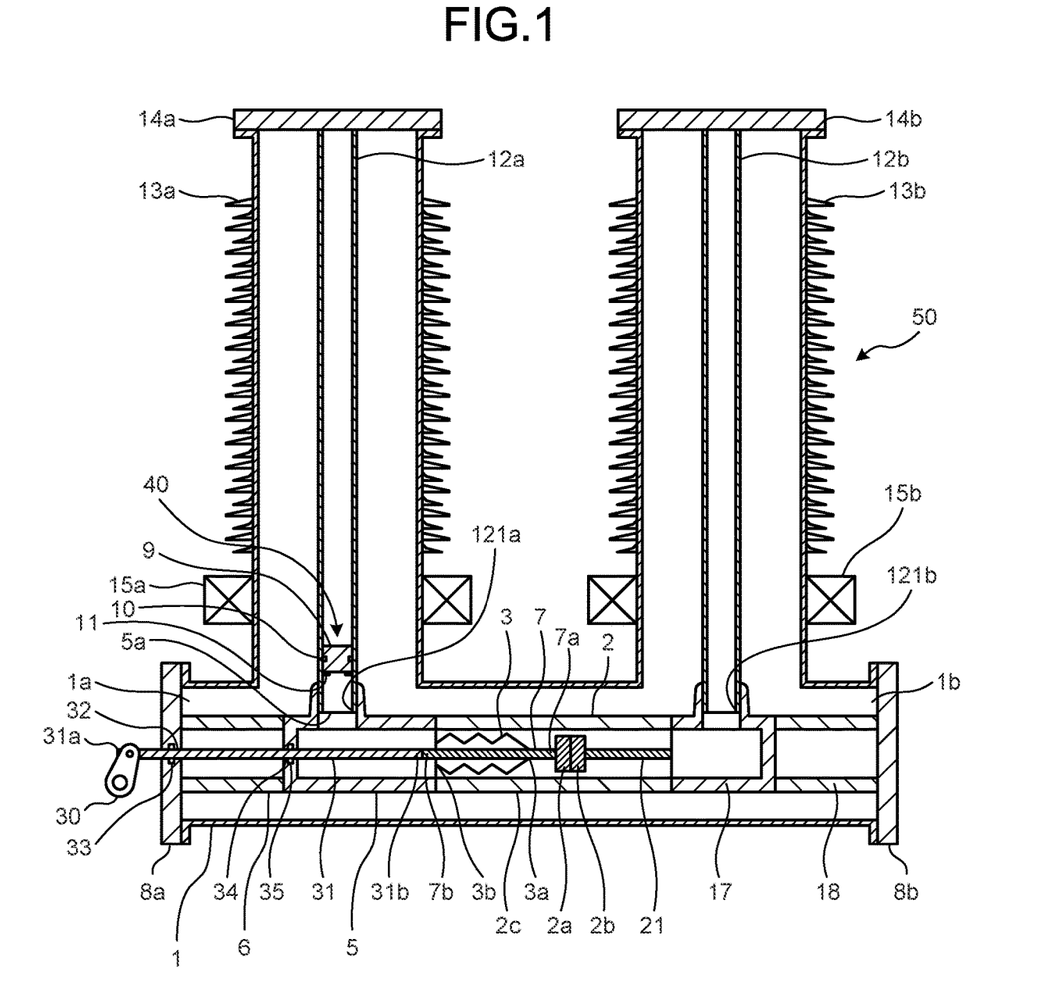
FIG. 1 is a sectional view of a vacuum circuit breaker according to a first embodiment in a closing state.
Figure 2:
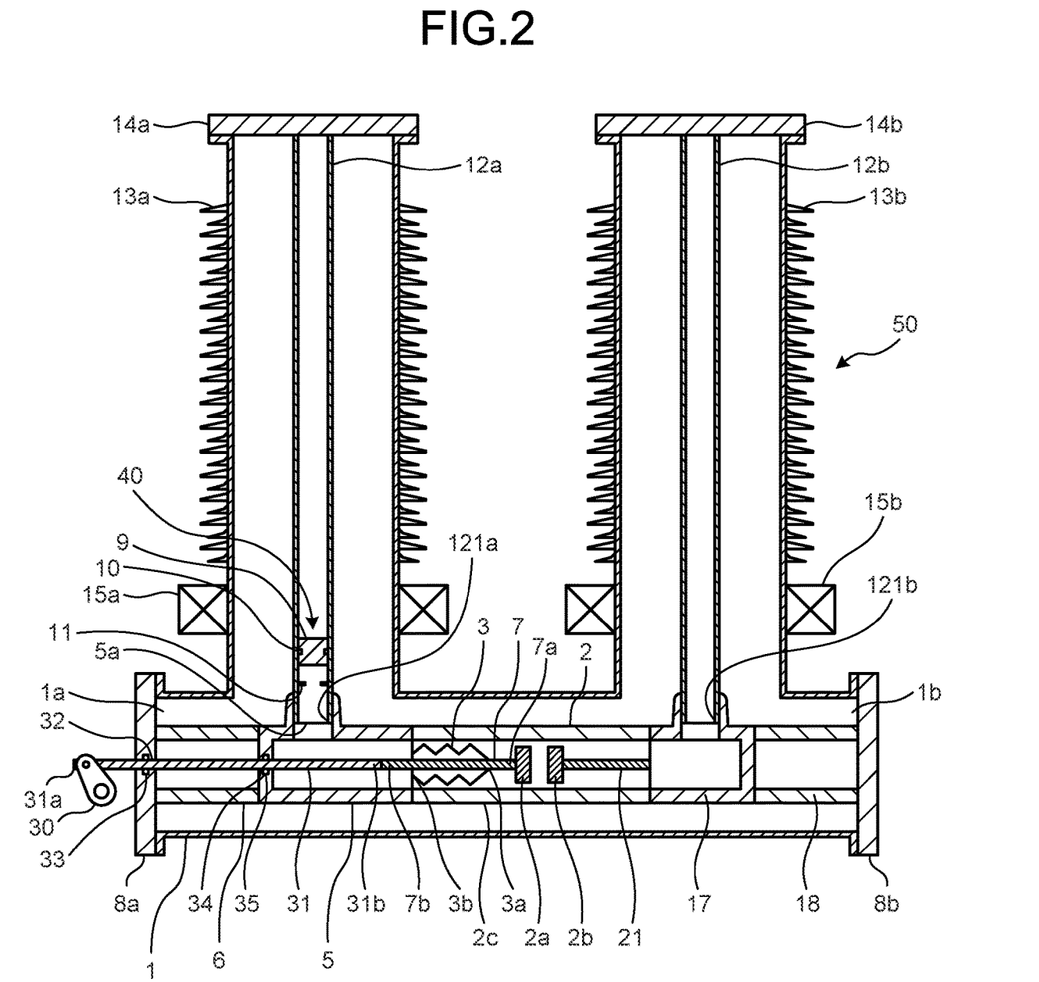
FIG. 2 is a sectional view of the vacuum circuit breaker according to the first embodiment in an interrupting state.

FIG. 1 is a sectional view of a vacuum circuit breaker according to the first embodiment in a closing state. FIG. 2 is a sectional view of the vacuum circuit breaker according to the first embodiment in an interrupting state. The vacuum circuit breaker 50 according to the first embodiment includes a tubular grounded tank 1 hermetically containing an insulating gas and a vacuum valve 2 that is insulatively supported inside the grounded tank 1, the valve 2 having a movable contact 2a and a stationary contact 2b. With an interface between the movable contact 2a and the stationary contact 2b as a boundary, some of members constituting the vacuum circuit breaker 50, serving as a half part thereof including the movable contact 2a are expressed using a wording "movable side", and the remainders of the members, serving as another half part thereof including the stationary contact 2b are expressed using a wording "stationary side". The vacuum circuit breaker 50 according to the first embodiment also includes a pair of tubular bushings 13a and 13b extending above the grounded tank 1, a movable-side bushing conductor 12a disposed in the bushing 13a, and a stationary-side bushing conductor 12b disposed in the bushing 13b. The vacuum circuit breaker 50 according to the first embodiment also includes a movable-side bushing terminal 14a that is connected with the movable-side bushing conductor 12a and covers an upper end of the bushing 13a and a stationary-side bushing terminal 14b that is connected with the stationary-side bushing conductor 12b and covers an upper end of the bushing 13b. The movable-side and stationary-side bushing terminals 14a and 14b have no vent holes provided therein and an upper end of each of the bushings 13a and 13b is hermetically sealed.

The bushing 13a is provided with a current transformer 15a that detects an electric current in the movable-side bushing conductor 12a. The bushing 13b is provided with a current transformer 15b that detects an electric current in the stationary-side bushing conductor 12b.

In addition to the movable contact 2a and the stationary contact 2b, the vacuum valve 2 includes a vacuum container 2c housing the movable and stationary contacts 2a and 2b and a movable conductor 7 having one end 7a electrically connected to the movable contact 2a and an opposite end 7b jutting out from the vacuum container 2c. The vacuum valve 2 also includes a stationary conductor 21 electrically connected to the stationary contact 2b and a tubular bellows 3 having one end 3a fixed to the movable conductor 7 and an opposite end 3b fixed to the vacuum container 2c.

The vacuum circuit breaker 50 also includes: an operating device 30 that is set externally to the grounded tank 1 and configured to insert and pull an operation rod 31 along an axial direction of the grounded tank 1 to switch between a closing state and an interrupting state; the operation rod 31 that has one end 31a connected to the operating device 30 and an opposite end 31b connected to the opposite end 7b of the movable conductor 7; a movable-side frame 5 that electrically connects a lower end 121a of the movable-side bushing conductor 12a to the movable conductor 7; and a stationary-side frame 17 that electrically connects a lower end 121b of the stationary-side bushing conductor 12b to the stationary conductor 21. The vacuum circuit breaker 50 also includes a movable-side insulating support tube 6 that is configured to insulatively support the movable-side frame 5 with respect to the grounded tank 1 and a stationary-side insulating support tube 18 that is configured to insulatively support the stationary-side frame 17 with respect to the grounded tank 1. The vacuum container 2c is fixed to the movable-side frame 5 and the stationary-side frame 17 by bolts, respectively, the bolts being unillustrated. The movable-side frame 5 has a hole 34 through which the operation rod 31 passes, and the hole 34 is choked with a packing 35 in an airtight manner.

The grounded tank 1 has an opening 1a situated on an end portion from which the operation rod 31 sticks out, and the opening 1a is covered with a movable-side support plate 8a having a hole 32 formed therein, the hole 32 being configured to let the operation rod 31 pass therethrough. The grounded tank 1 has an opening 1b situated on an end portion on the stationary side, and the opening 1b is covered with a stationary-side support plate 8b.

In the hole 32 of the movable-side support plate 8a, a packing 33 is provided. There is a gap between the movable-side support plate 8a and the operation rod 31, and this gap is closed by a packing 33 in a watertight manner.

The movable contact 2a receives a driving force from the operating device 30 via the operation rod 31 and the movable conductor 7. Upon the reception, the driving force from the operating device 30 enables the movable contact 2a to contact the stationary contact 2b in a closing state, and otherwise to separate from the stationary contact 2b in an interrupting state. The operation rod 31 is provided with a contact pressure spring (not illustrated) by which a force for pressing the movable contact 2a against the stationary contact 2b is applied to the operation rod 31 in a closing state. Therefore, certain electrical conduction performance is ensured between the movable contact 2a and the stationary contact 2b in the closing state.

The movable-side bushing conductor 12a has a tubular shape, and its lower end 121a is connected to an opening 5a of the movable-side frame 5. Inside the movable-side bushing conductor 12a, a movable slider 40 is movably accommodated. The slider 40 includes a movable member 9 and an airtight member 10. The movable member 9 has a rigid body. The airtight member 10 is made of an elastic material and attached to the movable member 9, and closes a gap between the movable-side bushing conductor 12a and the movable member 9 in an airtight state. A ring-shaped elastic member having a T-shaped cross-section can be used as the airtight member 10 but is not intended to limit the disclosure. Inside the movable-side bushing conductor 12a, there is provided a stopper 11 configured to set a lower limit position of a movable range for the slider 40.

Figure 3:
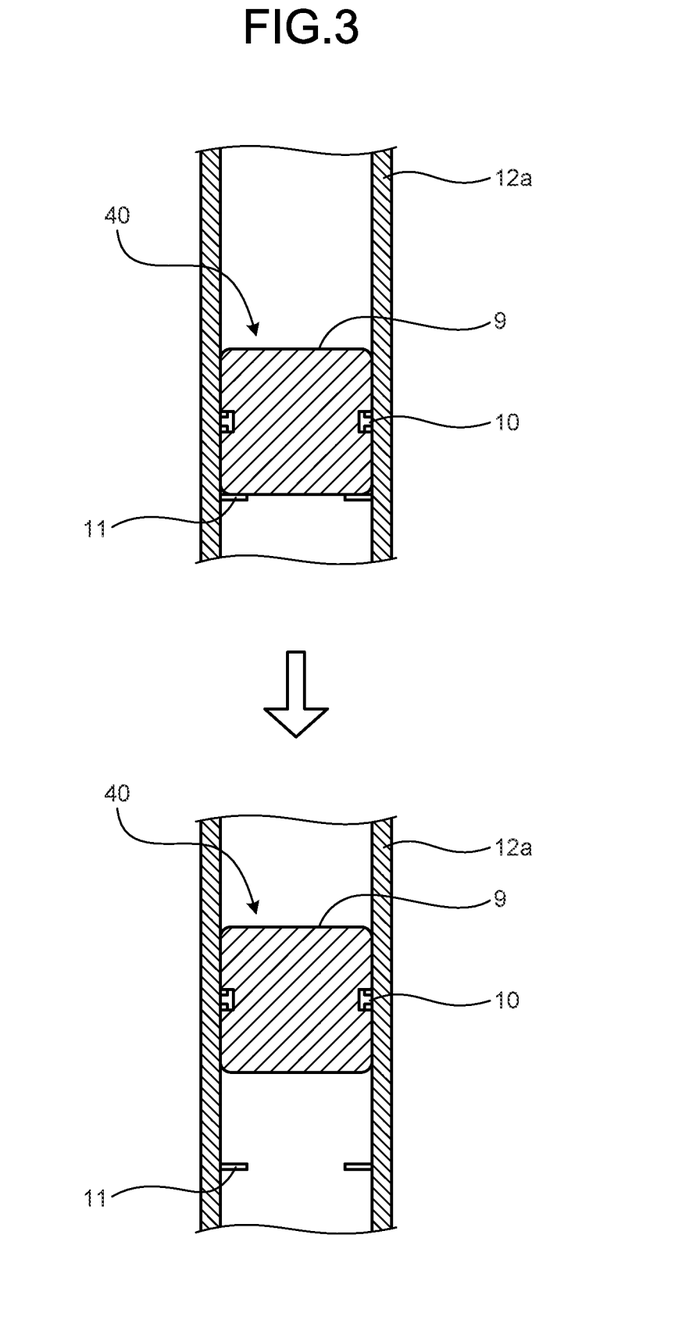
FIG. 3 illustrates how a slider moves in an interrupting operation of the vacuum circuit breaker according to the first embodiment.

In an interrupting operation of the vacuum circuit breaker 50, the operating device 30 moves the operation rod 31 in a direction in which the rod 31 is pulled out from the grounded tank 1. Accordingly, the movable conductor 7 fixed to the operation rod 31 moves toward the movable-side support plate 8a. Since the one end 3a of the bellows 3 is fixed to the movable conductor 7, the bellows 3 contracts in association with the movement of the movable conductor 7. By the contraction of the bellows 3, the gas in a portion below a part where the movable member 9 is situated, of the bellows 3, the movable-side frame 5, and the movable-side bushing conductor 12a, is compressed. FIG. 3 illustrates how the slider moves in the interrupting operation of the vacuum circuit breaker according to the first embodiment. The slider 40 is movable inside the movable-side bushing conductor 12a, and so the slider 40 cancels out an increase in pressure caused by the contraction of the bellows 3 when moving inside the movable-side bushing conductor 12a. In other words, the volume of a part below the slider 40 in a space inside the movable-side bushing conductor 12a increases as much as the contraction of the bellows 3 makes a space inside a tube of the bellows 3 smaller. Therefore, a pressure difference between the inside and the outside of a tube of the bellows 3 does not change even in the interrupting operation, and the bellows 3 is prevented from being damaged in the interrupting operation.

By the stopper 11 being provided inside the movable-side bushing conductor 12a, the slider 40 is prevented from intruding into the inside of the movable-side frame 5.

In the vacuum circuit breaker 50 according to the first embodiment, the movable-side bushing terminal 14a has no hole and the hole 32 in the movable-side support plate 8a penetrated by the operation rod 31 is provided with the packing 33, so that any water droplets can be prevented from entering the grounded tank 1. Moreover, by virtue of the movement of the slider 40 inside the movable-side bushing conductor 12a, the pressure difference is not changed between the inside and the outside of a tube of the bellows 3 even if the bellow 3 expands or contracts, thereby making it possible to prevent the bellows 3 from being damaged in the interrupting operation.

Although the slider 40 has the airtight member 10 that is situated at a middle position of the movable member 9 in a longitudinal direction, the slider 40 may be configured to have two or more airtight members 10 arranged in a vertical direction of the movable member 9. By the two or more airtight members 10 being provided for the movable member 9, the movable member 9 can be prevented from tilting when the slider 40 moves.

Second Embodiment

Figure 4:
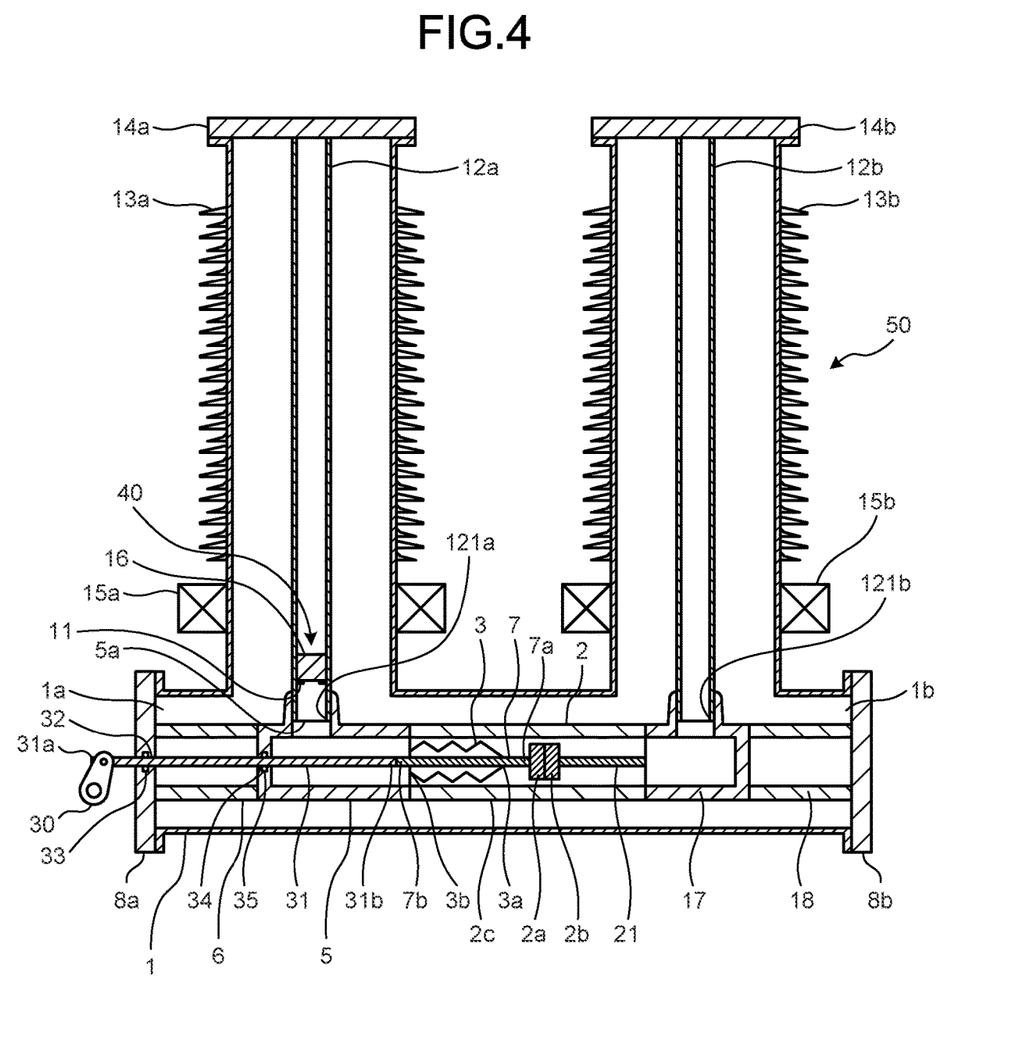
FIG. 4 is a sectional view of a vacuum circuit breaker according to a second embodiment in a closing state.
Figure 5:
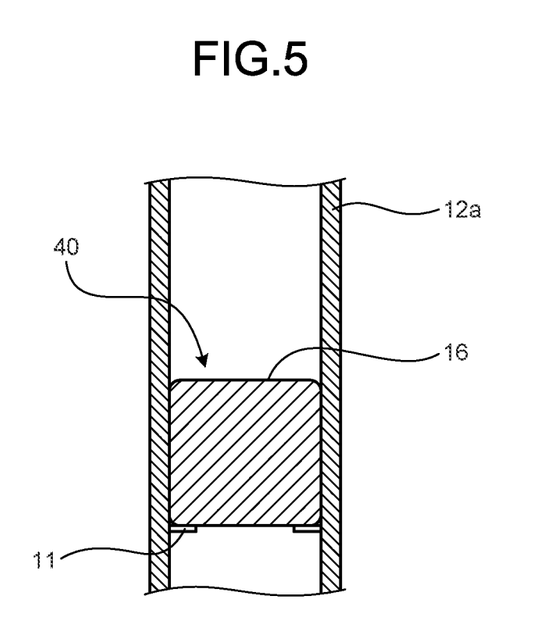
FIG. 5 is an enlarged view of a slider of the vacuum circuit breaker according to the second embodiment.

FIG. 4 is a sectional view of a vacuum circuit breaker according to the second embodiment. The vacuum circuit breaker 50 according to the second embodiment differs from the vacuum circuit breaker 50 according to the first embodiment in that the slider 40 is configured with a unitary airtight member 16. FIG. 5 is an enlarged view of the slider of the vacuum circuit breaker according to the second embodiment. The unitary airtight member 16 is made of an elastic material and is in contact with the movable-side bushing conductor 12a in an airtight manner.

As in the vacuum circuit breaker 50 according to the first embodiment, the movable-side bushing terminal 14a has no hole and the hole 32 in the movable-side support plate 8a through which the operation rod 31 penetrates is provided with the packing 33, and so the vacuum circuit breaker 50 according to the second embodiment also makes it possible to prevent water droplets from entering the grounded tank 1. Moreover, in the vacuum circuit breaker 50 according to the second embodiment, by virtue of the slider 40 moving, a pressure difference between the inside and the outside of a tube of the bellows 3 is not changed in the interrupting operation, thus making it possible to prevent the bellows 3 from being damaged in the interrupting operation.

The above configurations illustrated in the embodiments are merely examples, and can each be combined with other publicly known techniques and partially omitted and/or modified without departing from the scope of the present disclosure.

REFERENCE SIGNS LIST 1 grounded tank; 1a, 1b, 5a opening; 2 vacuum valve; 2a movable contact; 2b stationary contact; 2c vacuum container; 3 bellows; 3a, 7a, 31a one end; 3b, 7b, 31b opposite end; 5 movable-side frame; 6 movable-side insulating support tube; 7 movable conductor; 8a movable-side support plate; 8b stationary-side support plate; 9 movable member; 10 airtight member; 11 stopper; 12a movable-side bushing conductor; 12b stationary-side bushing conductor; 13a, 13b bushing; 14a movable-side bushing terminal; 14b stationary-side bushing terminal; 15a, 15b current transformer; 16 unitary airtight member; 17 stationary-side frame; 18 stationary-side insulating support tube; 21 stationary conductor; 30 operating device; 31 operation rod; 32, 34 hole; 33, 35 packing; 40 slider; 50 vacuum circuit breaker; 121a, 121b lower end.

The invention claimed is:

1. A vacuum circuit breaker comprising:
   a grounded tank in which an insulating gas is encapsulated, the grounded tank having a tubular shape;
   a vacuum valve insulatively supported inside the grounded tank, the vacuum valve including a movable contact, a stationary contact, a vacuum container in which the movable contact and the stationary contact are housed, a movable conductor electrically connected to the movable contact, the movable conductor extending out of the vacuum container, and a tubular bellows having one end connected to the movable conductor and an opposite end connected to the vacuum container;
   a movable-side bushing conductor set in a bushing extending above the grounded tank, the movable-side bushing conductor having a tubular shape;
   a slider movably disposed inside the movable-side bushing conductor;
   a movable-side frame that is set adjacent to an outside of the vacuum container in a portion where the movable conductor extends out of the vacuum container, communicates with a space inside a tube of the bellows, and electrically connects a lower end of the movable-side bushing conductor to the movable conductor;
   an operation rod having one end portion protruding to an outside of the grounded tank and an opposite end portion connected to the movable conductor outside the vacuum container;
   an operating device set outside the grounded tank to move the operation rod along an axial direction of the grounded tank;
   a movable-side support plate having a hole formed therein, through which the operation rod passes and covering an end of the grounded tank where the operation rod extends out of the grounded tank; and
   a packing set in the hole to close a gap between the operation rod and the movable-side support plate in a watertight state.

2. The vacuum circuit breaker according to claim 1, wherein the slider includes:
   a movable member having a rigid body; and
   an airtight member made of an elastic material, the airtight member being attached to the movable member to close a gap between the movable-side bushing conductor and the movable member in an airtight state.

3. The vacuum circuit breaker according to claim 2, wherein a stopper is provided inside the movable-side bushing conductor to prevent the slider from entering an inside of the movable-side frame.

4. The vacuum circuit breaker according to claim 1, wherein the slider is made of an elastic material and is in contact with the movable-side bushing conductor in an airtight manner.

5. The vacuum circuit breaker according to claim 4, wherein a stopper is provided inside the movable-side bushing conductor to prevent the slider from entering an inside of the movable-side frame.

6. The vacuum circuit breaker according to claim 1, wherein a stopper is provided inside the movable-side bushing conductor to prevent the slider from entering an inside of the movable-side frame.

\* \* \* \* \*